(12) United States Patent
Stafford et al.

(10) Patent No.: US 11,695,488 B2
(45) Date of Patent: Jul. 4, 2023

(54) ATSC OVER-THE-AIR (OTA) BROADCAST OF PUBLIC VOLUMETRIC AUGMENTED REALITY (AR)

(71) Applicant: Sony Interactive Entertainment Inc., Tokyo (JP)

(72) Inventors: Jeffrey R. Stafford, San Mateo, CA (US); Todd Tokubo, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/390,880

(22) Filed: Jul. 31, 2021

(65) Prior Publication Data

US 2023/0034304 A1    Feb. 2, 2023

(51) Int. Cl.
| | |
|---|---|
| *H04N 13/388* | (2018.01) |
| *H04H 60/83* | (2008.01) |
| *H04H 60/88* | (2008.01) |
| *H04H 60/70* | (2008.01) |
| *H04N 21/478* | (2011.01) |
| *H04N 13/183* | (2018.01) |

(52) U.S. Cl.
CPC ............ *H04H 60/83* (2013.01); *H04H 60/70* (2013.01); *H04H 60/88* (2013.01); *H04N 13/183* (2018.05); *H04N 13/388* (2018.05); *H04N 21/4781* (2013.01)

(58) Field of Classification Search
CPC ........ H04H 60/83; H04H 60/70; H04H 60/88; H04N 13/183; H04N 13/388; H04N 21/4781
See application file for complete search history.

(56) References Cited

U.S. PATENT DOCUMENTS

| | | | | |
|---|---|---|---|---|
| 10,559,130 | B2 * | 2/2020 | Scott | G06T 7/50 |
| 10,852,906 | B2 * | 12/2020 | Cahill | A63F 13/79 |
| 11,061,977 | B1 * | 7/2021 | Raskar | H04N 21/4532 |
| 2002/0152462 | A1 * | 10/2002 | Hoch | H04N 5/222 |
| | | | | 348/E5.022 |
| 2014/0085484 | A1 | 3/2014 | Kambhatla | |
| 2014/0378194 | A1 * | 12/2014 | Bentley | A63F 13/573 |
| | | | | 463/3 |
| 2015/0026741 | A1 * | 1/2015 | Lamarca | H04N 21/44209 |
| | | | | 725/109 |
| 2016/0295256 | A1 * | 10/2016 | Sharma | H04N 21/4344 |
| 2017/0302982 | A1 | 10/2017 | Simpson et al. | |
| 2017/0332128 | A1 * | 11/2017 | Jeong | H04M 1/72415 |
| 2019/0116017 | A1 * | 4/2019 | Petruzzelli | H04L 67/02 |
| 2020/0106708 | A1 | 4/2020 | Sleevi | |

(Continued)

FOREIGN PATENT DOCUMENTS

WO    WO-2021101934 A1 *  5/2021

OTHER PUBLICATIONS

"ATSC Datacasting Paves Way for Flexibility of ATSC 3.0 In Distance Education", ATSC News, Feb. 1, 2021.

(Continued)

*Primary Examiner* — Michael Lee
(74) *Attorney, Agent, or Firm* — John L. Rogitz

(57) ABSTRACT

Techniques are described for using the Advanced Television Systems Committee (ATSC) 3.0 television protocol to deliver volumetric information for presentation on various displays using ATSC over-the-air communications channels.

20 Claims, 9 Drawing Sheets

(56) References Cited

U.S. PATENT DOCUMENTS

| | | | | |
|---|---|---|---|---|
| 2020/0275134 A1* | 8/2020 | Bang | ............... | H04N 21/21805 |
| 2020/0314445 A1* | 10/2020 | Park | ...................... | H04N 19/52 |
| 2020/0368616 A1* | 11/2020 | Delamont | ............. | A63F 13/213 |
| 2021/0150212 A1* | 5/2021 | Richey | ................... | G06V 20/40 |
| 2022/0180602 A1* | 6/2022 | Hao | ..................... | G06V 20/647 |
| 2022/0217389 A1* | 7/2022 | Sychev | ................. | H04N 19/70 |

OTHER PUBLICATIONS

Berivan Isik, "Neural 3D Scene Compression via Model Compression", Stanford University, retrieved from https://arxiv.org/pdf/2105.03120.pdf.

Cao et al., "3D Point Cloud Compression: A Survey", Télécom SudParis Institut Mines—Télécom, retrieved from https://dl.acm.org/doi/pdf/10.1145/3329714.3338130.

Komma et al., "Lossless Volume Data Compression Schemes", Visual Computing for Medicine GroupUniversity of Tubingen, Germany, 2007.

Mildenhall et al., "NeRF: Representing Scenes as Neural Radiance Fields for View Synthesis", retrieved from https://cseweb.ucsd.edu/~ravir/pratul_eccv20.pdf.

"International Search Report and Written Opinion", dated Sep. 23, 2022, from the counterpart PCT application PCT/US22/073327.

* cited by examiner

[seed data chunk 50%] / [full frame data chunk or frame-to-frame chunk 50%]

[SEED 1] / [FF1-1] -> [SEED 2] / [FF1-2] -> [SEED 1] / [F2F1] ->
[SEED 2] / [F2F2] -> [SEED 1] / [F2F4] -> [SEED 2] / [FF2-1] ->
[SEED 1] / [FF2-2] -> etc...

ATSC OVER-THE-AIR (OTA) BROADCAST OF PUBLIC VOLUMETRIC AUGMENTED REALITY (AR)

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in ATSC A/300 for delivering the next generation of broadcast television. ATSC 3.0 supports delivery of a wide range of television services including, but not limited to, televised video, interactive services, non-real time delivery of data, and tailored advertising to a large number of receiving devices, from ultra-high-definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard. Present principles are directed to such advances as divulged below.

SUMMARY

As understood herein, broadcasting in ATSC 3.0 multicasts data from one source to many receivers. ATSC 3.0 allows for User Defined tables in the Low Level Signaling starting point of Service Discovery (A/331 Standard) which are entirely user specific. Principles set forth in co-pending U.S. patent application Ser. No. 16/952,581, incorporated herein by reference, may be used as appropriate in implementing present principles.

As further understood herein, live AR content streaming over IP channels specific per user for their differing locations and perspectives, presents significant bandwidth and latency challenges, especially for mobile AR devices and their existing data restrictions (caps, shared BW with other services). Present techniques are provided to use existing ATSC TV Broadcast infrastructure, existing Digital TV Channel data, which is replaced by a temporarily encoded stream of volumetric data to enable view-independent 3D data overlay (Volumetric AR).

The details of the present application, both as to its structure and operation, can best be understood in reference to the accompanying drawings, in which like reference numerals refer to like parts, and in which:

DETAILED DESCRIPTION

Figure 1:
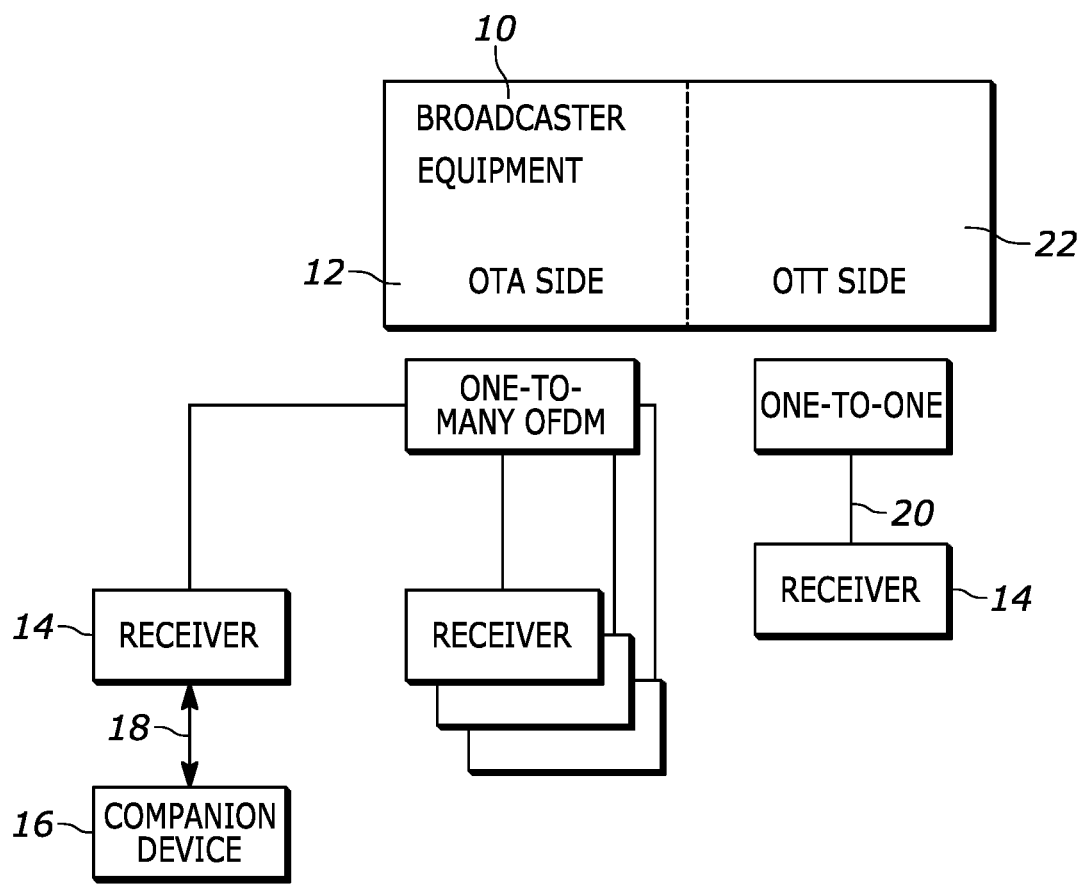
FIG. 1 is a block diagram of an Advanced Television Systems Committee (ATSC) 3.0 system.

This disclosure relates to technical advances in digital television such as in Advanced Television Systems Committee (ATSC) 3.0 or higher television. An example system herein may include ATSC 3.0 source components and client components, connected via broadcast and/or over a network such that data may be exchanged between the client and ATSC 3.0 source components. The client components may include one or more computing devices including portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java/JavaScript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
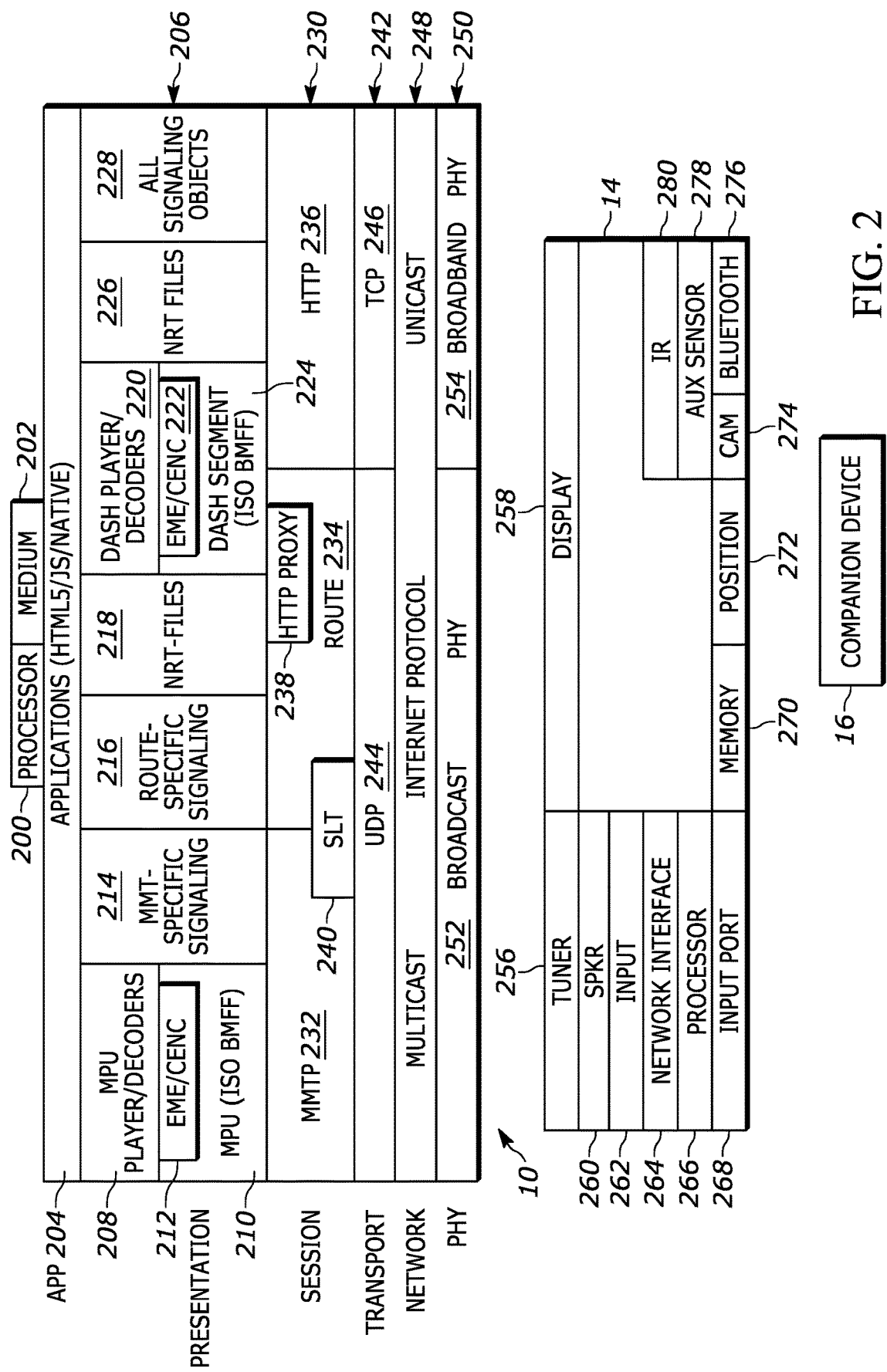
FIG. 2 is a block diagram showing components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/JavaScript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements. Audio video (AV) streams are contained in ROUTE sessions. Layered coding transport (LCT) channels are setup within a ROUTE session. Each LCT channel carries either video or audio or captions or other data.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses user datagram protocol (UDP) 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile formatted data sent through the various protocols (HTTP/TCP/IP) in the protocol stack may be used on the broadband side. Media files in the DASH-IF profile formatted data based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a computer game console or controller or head-mounted display (HMD), a notebook computer, a wearable computerized device, and so on. Regardless, it is to be understood that the receiver 14 and/or other computers described herein is configured to undertake present principles (e.g., communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high-definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g., receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g., all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

Figures 3, 3A:
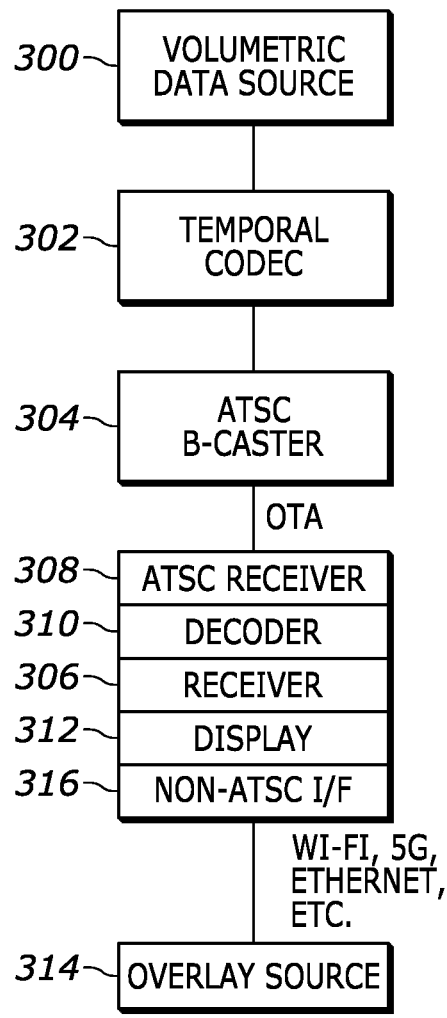
FIG. 3 illustrates an example specific system for combining ATSC broadcast volumetric audio-video (AV) content with AV content received from other than ATSC sources.
FIG. 3A illustrates a data structure.

FIG. 3 illustrates an example system consistent with present principles. A source 300 such as a computer game server or console of augmented reality (AR) volumetric data including real time (live) changes to the volumetric data sends the data to a temporal codec 302 to be compressed. Along with the volumetric data, side-band data for providing an initial seeding for the volumetric content represented by the data is sent. The compressed data is sent from the codec 302 to an ATSC broadcaster assembly 304, such as an ATSC 3.0 or higher broadcaster assembly.

Volumetric refers to data within a specific volume that is view-independent but includes sufficient information that allows a process to extract explicit views. Some of that information may include, e.g., GPS coordinates of objects within the volumetric data.

An example of volumetric data may be a computer simulation such as a computer game with "blocky" 3D terrain that players explore. An example of such a game is "Minecraft". A 3D volume of width×height×depth blocks or cells is used to store information about the "Minecraft world". Each cell may contain information describing a 3D block, each a piece of ground, dirt, rock, tree, etc. Empty space may be encoded in a more efficient manner.

This same basic approach can be applied to 3D data that can be used for Augmented Reality (AR), in which 3D data is overlaid onto a real-world location. The "blocky" world that makes up the AR is encoded into this volumetric data. However, any 3D object or informational representation can be encoded as volumetric data.

The benefit of encoding AR objects as volumetric data is that they only need to be encoded once if they are static objects (for instance, an AR road sign) and temporarily updated if they are dynamic (as an example, wheels turning on a car). For a virtual world to be overlaid as AR, most of the world typically is static (ground, hills, mountains, trees, buildings, etc.) with periodic changes (clouds moving, characters and animals moving around, trees animating, etc.) The encoding of volumetric data is not dependent on how the data is viewed, i.e., it is view-independent, compared to other techniques to encode 3D data such as geometry, textures, materials, that also require rendering for a specific viewpoint (and hence are view-dependent). To render volumetric data for a specific view, various methods can be deployed, including but limited to ray tracing or ray casting into the dataset.

It is the view-independence of 3D volumetric data that enables broadcast delivery mechanism, in which everyone receives the same data. Only the process of how the data is interpreted, which is the rendering-specific view from the 3D volumetric data, needs to be done differently for each client/user of the data.

ATSC 3.0 can transmit, in addition to digital audio and video data, arbitrary data as well. Currently, just using the extra data channels in ATSC 3.0, ten mbit/second of 3D AR data can be sent. If TV channels were removed, twenty-five mbit/s or more may be made available. Photorealistic 3D volumetric data can be compressed in as little as 5 MB-LOMB. Based on using ATSC 3.0 data channel, about one MB can obtained in one second. So, a full volumetric model (character, scene, etc.) can streamed OTA in about five to ten seconds at most.

The bandwidth of OTA ATSC 3.0 data channel would not be enough for real-time interactive frame rates of thirty frames per second, but as mentioned, most content is static and only small changes happen at every $\frac{1}{30}$th of a second.

For the 10 mbit OTA example, 333 Kbit/s can be available frame to frame changes of any volumetric data. Present techniques accordingly us three phases to the OTA streaming of volumetric data.

In the first, or seed, phase, before a volumetric model data can be used by a client (receiver) to show an appropriate view of 3D model, enough data is needed to provide a based dataset before changes can be applied. "Seed" data accordingly is sent first. The seed data contains all the static elements of the volumetric data. For some 3D models or applications, for instance the Minecraft example, this seed data could be a significant portion of the volumetric data.

A portion of this data can be streamed constantly within the OTA data stream, for example, one-half or five mbit/s in this example. The seed data is broken into numbered portions and streamed constantly. Once a client has received all numbered portions, the client can proceed to the next phase.

The next phase may be termed the "Full Frame (FF) Phase" in which a client device looks at the temporal data (for instance, the other 50% of the example above, again five mbit/s) sent OTA. A "frame" of changes to the static seed data is broken up into pieces and broadcast in the temporal data section.

Once a client receives all the pieces of the frame data (they come in 5 MB chunks), the client receiver can now show the volumetric content.

In the third phase, which may be termed "Frame-to-Frame (F2F) Phase", periodically after the frame data, frame-to-frame data is broadcast. This data just contains the small changes from one frame of changing content to the next, e.g., 1/30th of a frame of animation to the next.

An example of the flow of data in the OTA broadcast according to the above may be:

[seed data chunk 50%]/[full frame data chunk or frame-to-frame chunk 50%]

[SEED 1]/[FF1-1]→[SEED 2]/[FF1-2]→[SEED 1]/[F2F1]→[SEED 2]/[F2F2]→[SEED 1]/[F2F4]→[SEED 2]/[FF2-1]→[SEED 1]/[FF2-2]→ etc . . . .

Returning to FIG. 3, the data is broadcast from the assembly 304 over-the-air (OTA) to receiver assemblies 306 (only a single receiver assembly 306 shown in FIG. 3 for clarity.)

In the example shown, the receiver assembly 306 includes an ATSC 3.0 or higher receiver 308 (which typically includes an antenna) and a decoder 310 that decodes information from the receiver 308. The decoded volumetric data is presented on a display 312 under control of the processor of the receiver assembly 306, which may include appropriate components from FIG. 2 in addition to those shown n FIG. 3.

The receiver assembly 306 also includes a non-ATSC interface 316 such as a Wi-Fi transceiver, Bluetooth transceiver, 5G or other wireless telephony transceiver, Ethernet interface, etc. that communicates with a source 314 of overlay information to be presented on the display 312 along with the volumetric content received via ATSC OTA broadcast.

Accordingly, client receiver assemblies with ATSC receivers can "tune in" to the AR broadcast and after a few seconds of decoding the side-band data, can visualize live AR overlay of 3D visuals with audio, from their device's location and perspective.

Figure 4:
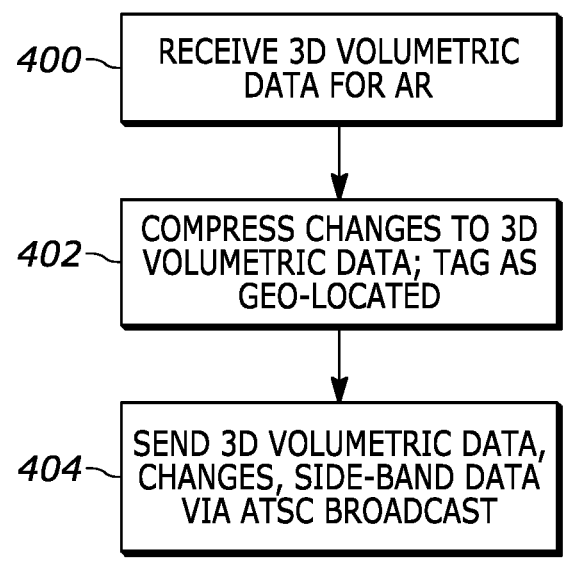
FIG. 4 illustrates example ATSC broadcast transmitter logic in example flow chart format.

FIG. 4 illustrates further. Commencing at block 400, 3D volumetric data is received. The data and/or changes thereto in real time is compressed at block 402. If desired, the data to be broadcast can be tagged as geo-located to a very specific location on the globe, down to the nearest cm or mm. This can be used for AR broadcasts of public information such as public buildings and sites, public events, etc. Block 404 indicates that the compressed 3D volumetric data with changes and side-band data is broadcast OTA via ATSC (e.g., ATSC 3.0).

Figure 5:
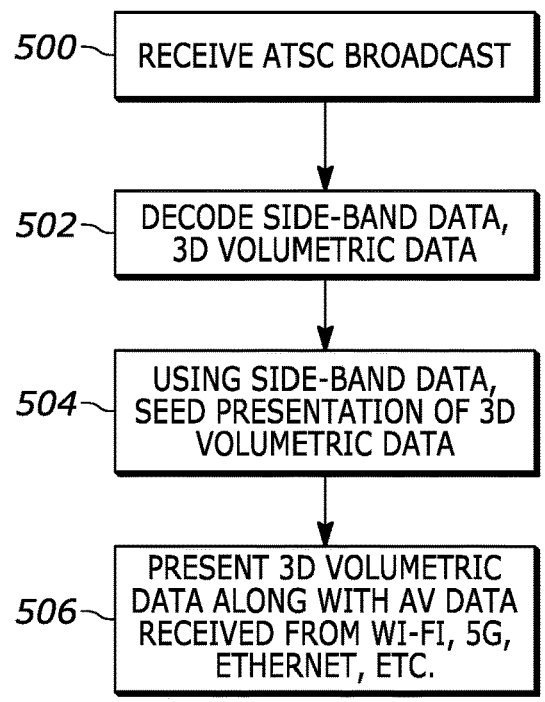
FIG. 5 illustrates example ATSC broadcast receiver logic in example flow chart format.

FIG. 5 illustrates complementary receiver side logic. The ATSC broadcast data is received at block 500 and the side-band data decoded to start decoding of the 3D volumetric data at block 502. Proceeding to block 504, using the side-band data, presentation of the 3D volumetric data is seeded. The 3D volumetric data is presented at block 506 along with audio-video information received from the non-ATSC interface 316 shown in FIG. 3.

Figure 6:
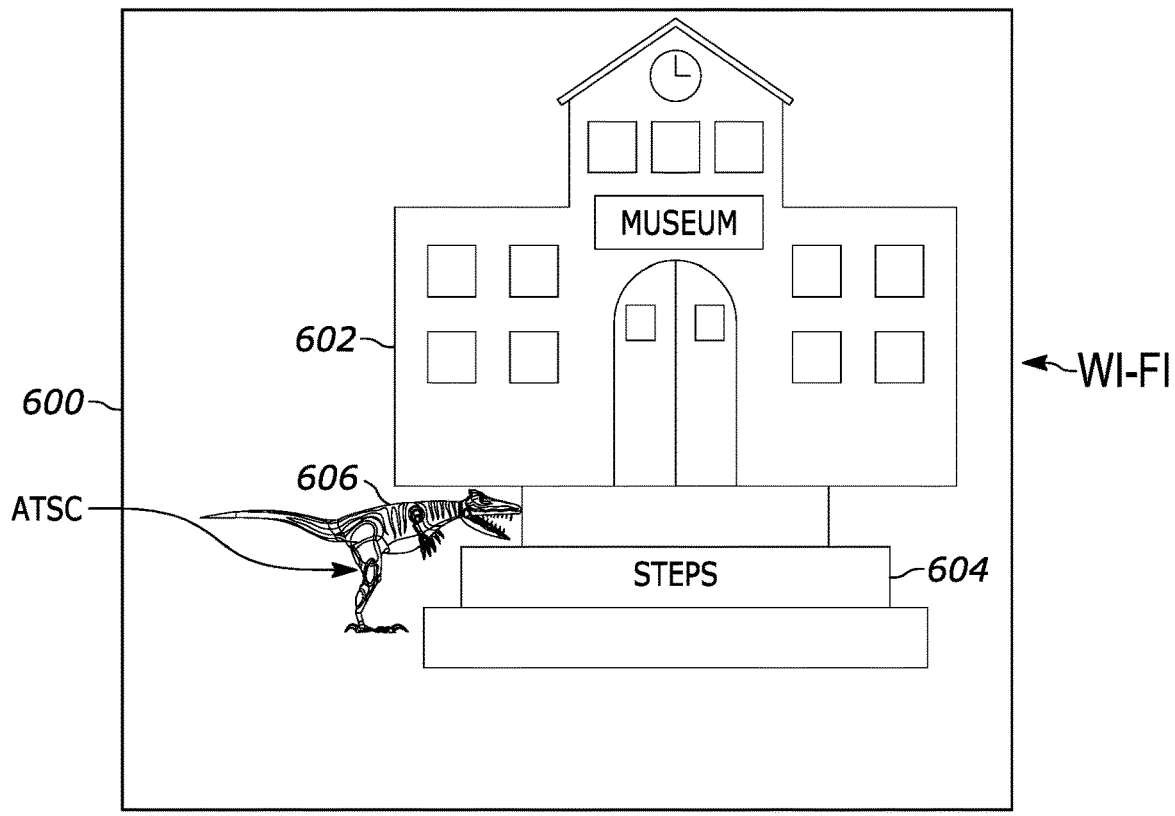
FIG. 6 illustrates a screen shot of an example AV presentation using ATSC volumetric content overlaid onto content received from a non-ATSC source.

FIG. 6 illustrates that for instance, a display 600 such as any display herein may present an image of a museum 602 holding a special event on its dinosaur bone collection that uses a promotional broadcast feed from a local ATSC broadcaster to provide animated dinosaurs 606 in AR on the front steps 604 of the museum along with other event information.

Figure 7:
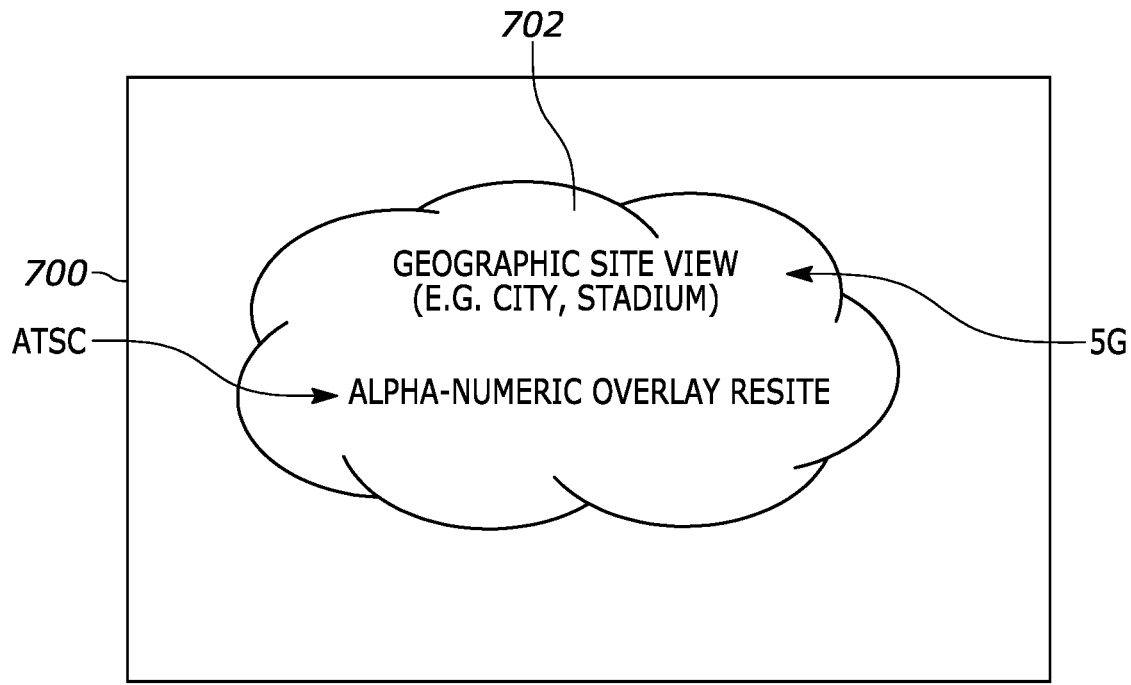
FIG. 7 illustrates a screen shot of an example AV presentation using ATSC alpha-numeric data overlaid onto content received from a non-ATSC source.

FIG. 7 illustrates alternate use cases in which a display 700 such as any display herein presents alpha-numeric information 704 such as AR bus schedules and routes are overlaid onto an image 702 of a geographic site such as a city. Other examples of the alpha-numeric AR overlay include emergency/disaster planning information guiding AR users to safe areas, AR game stats overlaid at sports and eSports venues, etc. using localized ATSC transmitters located at the Stadiums.

Figure 8:
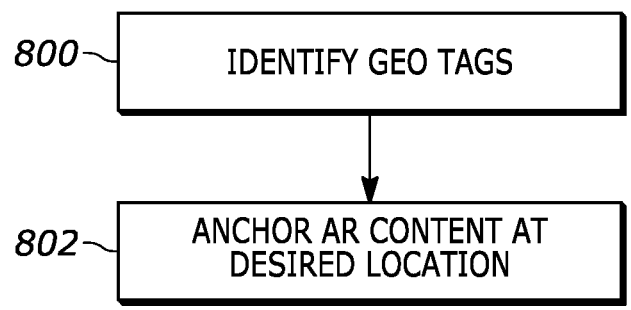
FIG. 8 illustrates example logic in example flow chart format for geo-tagging ATSC volumetric content.

FIG. 8 illustrates. Commencing at block 800, geo tags are identified in the ATSC broadcast data so that at block 802 the accompanying AR content can be overlaid onto images of the desired geographic location specified by the geo tags.

Figure 9:
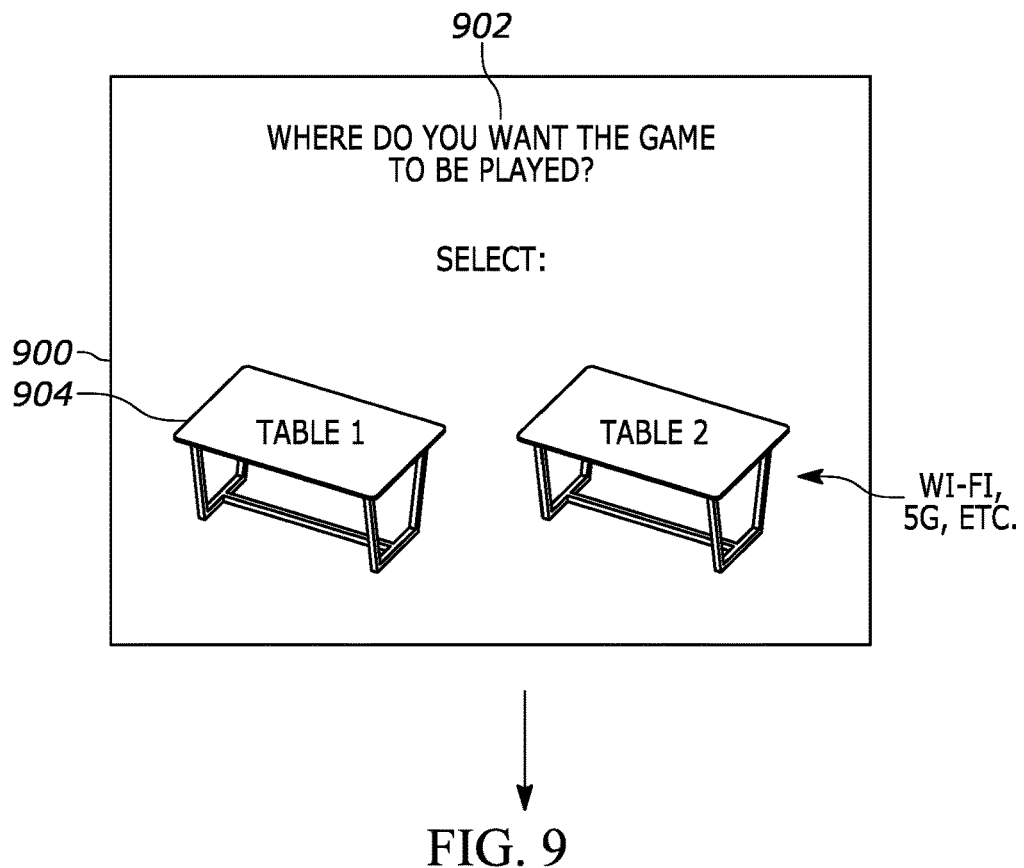
FIGS. 9 and 10 illustrate screen shots of an example presentation consistent with FIG. 8.
Figure 10:
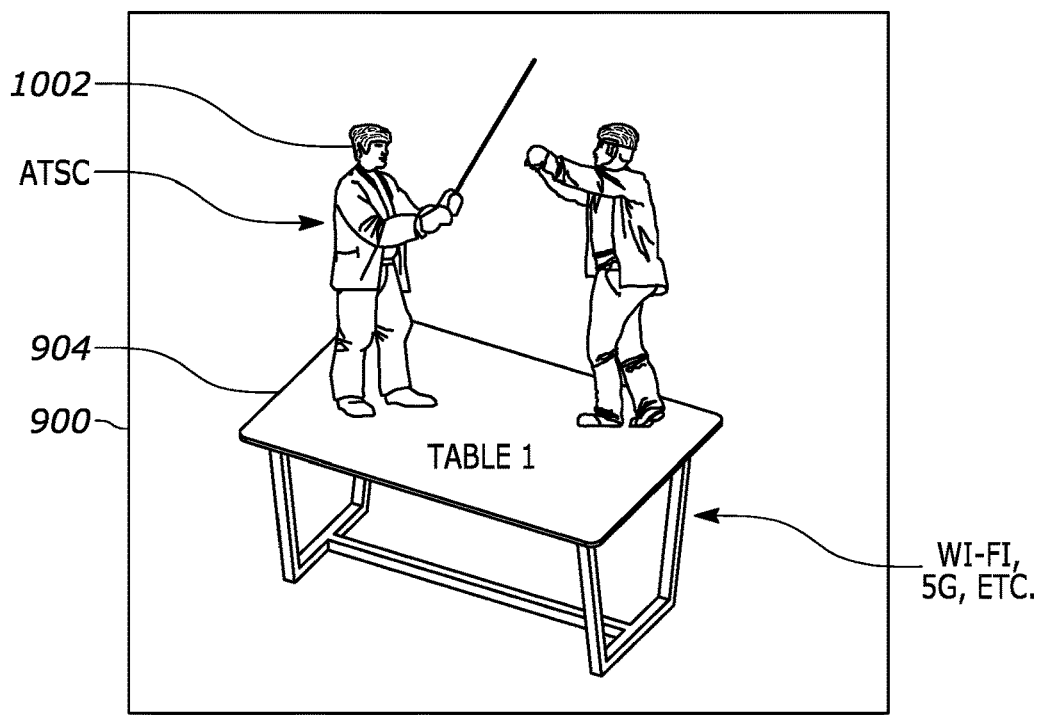

Or, as shown in FIG. 9 the AR data may not include geo tags (or equivalently may be tagged as not being tied to any particular location), giving clients the option to anchor the AR content wherever they want. In the example of FIG. 9, an AR version of a computer game can be received via ATSC for presentation on a display 900 such as any display herein, with a prompt 902 for the user to select which object in a real-world field of view (e.g., as seen through an AR HMD) the user wishes the AR version of the computer game to be overlaid on. In the example shown, two tables 904 are in the real-world field of view, and as shown in FIG. 10 the user has selected "table 1" on which the AR volumetric data (in this example, a computer game consisting of characters 1002) are overlaid. The real-world images may be received from the non-ATSC interface 3416 shown in FIG. 3.

Thus, the computer game is scaled and "placed" on table 1 as a volumetric 3D chunk. Users can walk around the table to see the game action from different perspectives using their ATSC capable Smartphones, Tablets or AR Glasses, etc.

The volumetric data is encoded in such a way as to be compatible with existing ATSC (e.g., 3.0) encoding standards and allow for efficient, high equality decoding on client devices equipped with ATSC receivers. The content broadcast over the air is therefore completely free to all people with ATSC receivers and the data bandwidth does not conflict with their existing data delivery services (Wi-Fi, 5G, etc.). In addition to OTA Public AR, private or group AR overlays can be added on top of the ATSC derived data using IP traffic over other data delivery services (Wi-Fi, 5G, etc.).

The benefit of this hybrid ATSC data plus IP data model is that the bandwidth is shared between different radio frequencies and IP traffic can be kept to a minimum, only for the private data that is required.

Figure 11:
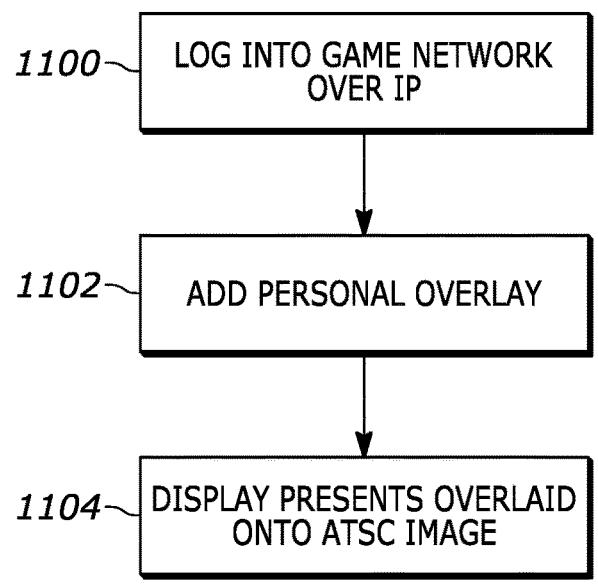
FIG. 11 illustrates example logic in example flow chart format for adding personal overlays onto ATSC broadcast volumetric content.

FIG. 11 illustrates an additional example in which, referring back to the computer game of FIGS. 9 and 10, users can at block 1100 log into a game service network over an IP channel and add additional AR information at block 1102 on top of the public feed that everyone else is viewing for presentation of the augmented hybrid content at block 1104.

Figure 12:
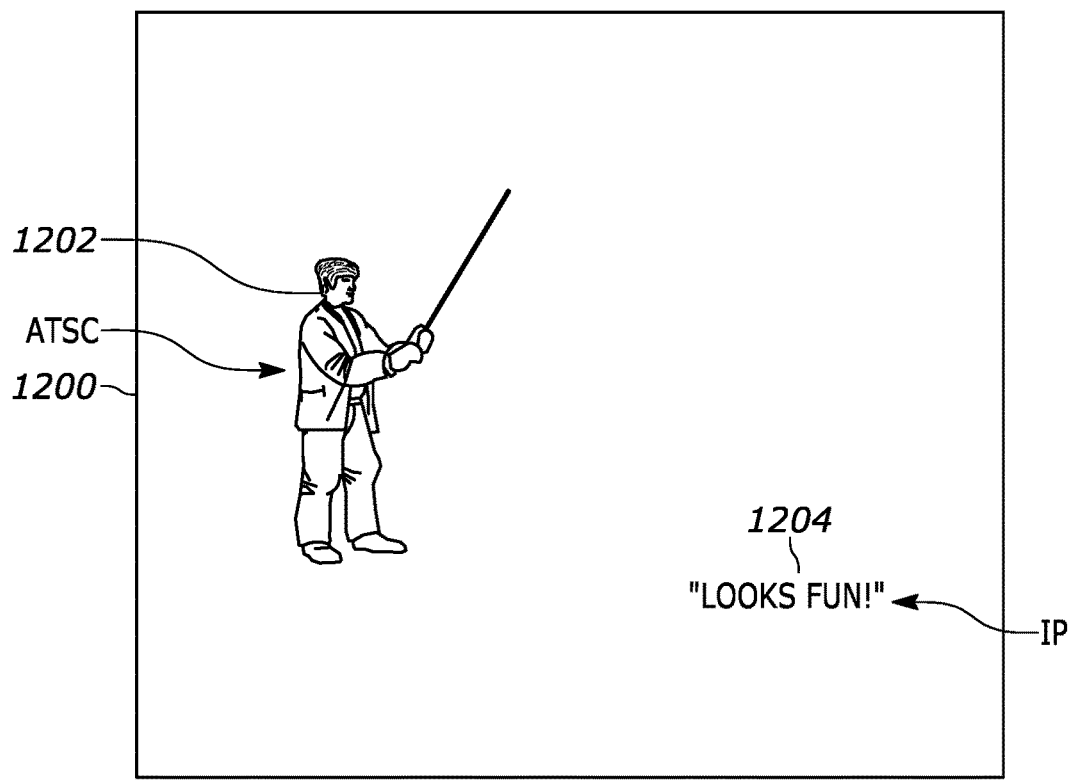
FIG. 12 illustrates an example screen shot consistent with FIG. 11.

As illustrated in related FIG. 12, a display 1200 such as any display herein can present the ATSC OTA information 1202 overlaid with the private overlay information 1204, which in the example shown may include message chats (that may be age restricted) or selected player statistics, biographies, etc.

Figure 13:
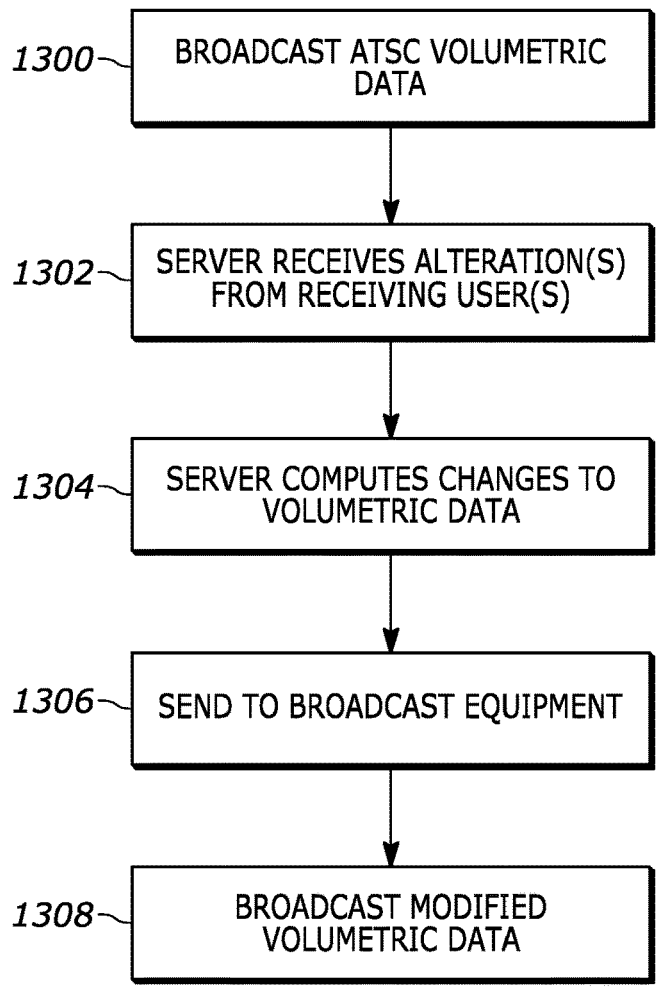
FIG. 13 illustrates example logic in example flow chart format for allowing end users to modify ATSC broadcast volumetric content.

It should be noted as indicated at block 1300 in FIG. 13 that the OTA broadcast of AR is one-way, delivering consistent live AR content to view, listen and feel (via client haptics). Alterations to the broadcast volumetric data may be received at block 1302 responsive to an end user employing, e.g., a computer game controller, with the alterations being received via standard IP channels (Ethernet, Wi-Fi, 5G, etc.). For example, for a live volumetric AR computer game competition, players use their client devices to send player inputs (virtual character actions) to a central server at block 1302 using standard IP channels or via a direct IP (5G, etc.) connected game controller. At block 1304 the server identifies the many player inputs and computes the changes to the computer game competition volumetric world. Proceeding to block 1306, the server sends the changes to volumetric data to the ATSC broadcaster assembly 304 shown in FIG. 3. This may be done using a high-speed fiber connection (Internet Backbone). The modified AR volumetric data is broadcast OTA at block 1308 as described previously.

Figure 14:
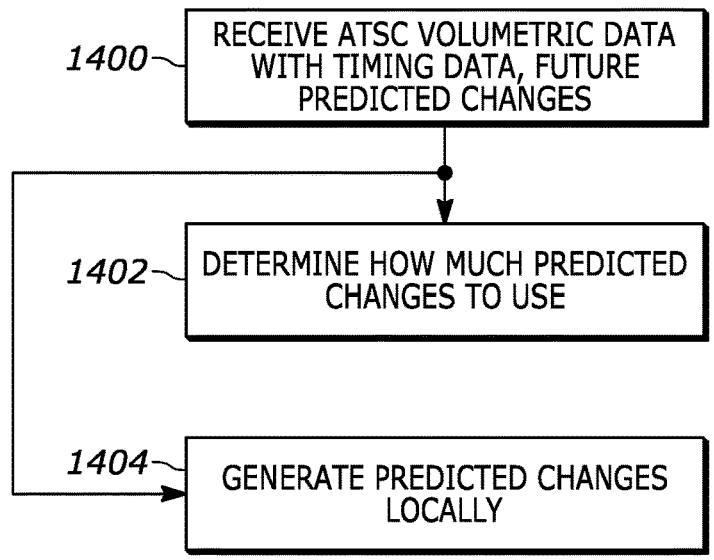
FIG. 14 illustrates example logic in example flow chart format for addressing latency issues.

FIG. 14 illustrates that to account for latencies in the systems described above, at block 1400 the volumetric AR data can be received encoded with timing data and future predicted changes. The volumetric AR is broadcast and proceeding to block 1402, a receiving client can determine from the time stamps compared to their local clock how much of the predicted data they must use. Alternatively, at block 1404 the client devices themselves generate the predicted volumetric changes based on the timing data.

Present techniques may be used for every day, low-impact, highly reliable broadcasts of games and virtual events in AR for spectating. Players interacting with games on this service could be doing this in the current form, with direct IP communication.

The methods described herein may be implemented as software instructions executed by a processor, suitably configured application specific integrated circuits (ASIC) or field programmable gate array (FPGA) modules, or other manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

It will be appreciated that whilst present principals have been described with reference to some example embodiments, these are not intended to be limiting, and that various alternative arrangements may be used to implement the subject matter claimed herein.

What is claimed is:

1. A digital television transmitter assembly comprising:
   at least one processor programmed with instructions to:
   send, via over-the-air (OTA) transmission, to at least one display augmented reality (AR) information comprising AR images to be presented on the display, the AR information comprising at least one computer game with 3D volume of width, height, and depth information describing respective 3D regions and along with the AR information side-band data for providing an initial seeding for the AR information, volumetric data in the AR information being view-independent but including information that allows a process to extract explicit views, view-independence of the volumetric data enabling plural receivers receiving a same volumetric data with each receiver individually rendering a specific view of the volumetric data differently than other receivers receiving the volumetric data.

2. The digital television transmitter assembly of claim 1, wherein the digital television comprises advanced television systems committee (ATSC) 3.0 television.

3. The digital television transmitter assembly of claim 1, wherein the AR information comprises computer game information.

4. The digital television transmitter assembly of claim 1, wherein the AR information comprises alpha numeric information.

5. The digital television transmitter assembly of claim 1, comprising at least one server programmed with instructions to:
   receive input from plural receivers of the AR information;
   alter AR information to be broadcast according to the input; and
   provide altered AR information to the digital television transmitter assembly for transmission thereof.

6. The digital television transmitter assembly of claim 1, wherein the AR information comprises geographic location information.

7. A digital television receiver assembly comprising:
   at least one display for presenting augmented reality (AR) images received from a digital television broadcast; and
   at least one processor configured with instructions for:
   controlling the display to present the AR images; and
   present on the display, along with the AR images, images from a non-Advanced Television Systems Committee (ATSC) source, wherein the AR images comprise:
   a computer game with volumetric data, presenting the AR images comprising:
   a first phase comprising receiving, before the volumetric data is displayed, a base dataset before changes are applied, the first phase providing seed data containing static elements of the volumetric data;
   a second phase comprising receiving temporal data representing changes to the seed data; and
   a third phase comprising receiving frame-to-frame data comprising changes from one frame of changing content to a next frame, presenting the AR images comprising presenting the seed data received in the first phase as modified by data received in the second and third phases.

8. The digital television receiver assembly of claim 7, wherein the non-ATSC source comprises a Wi-Fi source.

9. The digital television receiver assembly of claim 7, wherein the non-ATSC source comprises a wireless telephony source.

10. The digital television receiver assembly of claim 7, wherein the non-ATSC source comprises an Ethernet source.

11. The digital television receiver assembly of claim 7, wherein the processor is configured with instructions for:
    presenting the AR images in accordance with side-band information received in the digital television broadcast.

12. The digital television receiver assembly of claim 7, wherein the processor is configured with instructions for:
    identifying the images from the non-ATSC source based on user input; and
    overlaying the AR images onto the images from the non-ATSC source according to the user input.

13. A system comprising:
    at least one Advanced Television Systems Committee (ATSC) over-the-air broadcast assembly configured to broadcast augmented reality (AR) volumetric content;
    at least one ATSC receiver assembly comprising at least one ATSC receiver configured to receive the AR volumetric content from the broadcast assembly and at least one non-ATSC communication interface configured to receive non-ATSC content and present in one image on at least one display both the AR volumetric content from the broadcast assembly and the non-ATSC content, wherein the AR volumetric content comprises:
    a computer simulation, the AR volumetric content being received in a first phase and at least a second phase, the first phase comprising reception of static seed data and being received before the second phase, the second phase comprising reception of changes to the static seed data, wherein plural receivers receive a same AR volumetric content in the first phase with each receiver individually rendering a specific view of the volumetric data differently than other receivers based on data received in the second phase.

14. The system of claim 13, wherein the AR volumetric content comprises computer game content.

15. The system of claim 13, wherein the AR volumetric content comprises alpha numeric information.

16. The system of claim 13, comprising at least one server programmed with instructions to:
- receive input from plural receivers of the AR volumetric content;
- alter AR volumetric content to be broadcast according to the input; and
- provide altered AR volumetric content to the ATSC broadcast assembly for transmission thereof.

17. The system of claim 13, wherein the non-ATSC communication interface comprises a Wi-Fi interface.

18. The system of claim 13, wherein the non-ATSC communication interface comprises an Ethernet interface.

19. The system of claim 13, wherein the non-ATSC communication interface comprises a wireless telephony interface.

20. The system of claim 13, wherein the ATSC receiver assembly is configured for:
- identifying selection of at least one image from the non-ATSC communication interface based on user input; and
- overlaying the AR volumetric content from the ATSC broadcast assembly onto the images from the non-ATSC communication interface according to the user input.

* * * * *